United States Patent [19]
Van Den Bergh

[11] Patent Number: 5,391,261
[45] Date of Patent: Feb. 21, 1995

[54] METHOD OF BLEACHING DE-INKED PULP AND REMOVING THE INK PARTICLES WITH STEAM

[75] Inventor: Luc Van Den Bergh, Tisselt, Belgium

[73] Assignee: Morton International, Inc., Chicago, Ill.

[21] Appl. No.: 46,223

[22] Filed: Apr. 13, 1993

[30] Foreign Application Priority Data

Apr. 15, 1992 [GB] United Kingdom ............... 92082266

[51] Int. Cl.6 .................... D21C 5/02; D21C 9/10
[52] U.S. Cl. ............................................ 162/4; 162/7; 162/8; 162/68; 162/80
[58] Field of Search .................... 162/4, 5, 6, 7, 8, 68, 162/55, 80, 83

[56] References Cited

FOREIGN PATENT DOCUMENTS 0374057 11/1989 European Pat. Off. .
335268 1/1920 Germany .
4115575 5/1991 Germany .

OTHER PUBLICATIONS

Database WPIL, Section Ch, Week 9245, Derwent Publications Ltd., London, GB; Class F09, AN 92-370369, Sep. 1992.
Abstract Bulletin of the Institute of Paper Chemistry, vol. 48, No. 4, Oct. 1977, Appleton US, p. 466.

Primary Examiner—Steve Alvo
Attorney, Agent, or Firm—Mark F. LaMarre; Charles N. Lovell; Gerald K. White

[57] ABSTRACT

Deinked paper pulp is subjected to bleaching with sulfite or bisulfite ions and a reducing agent, preferably sodium bisulfite and sodium borohydride in aqueous alkaline solution. To assist the removal of ink particles, steam is bubbled through the pulp causing the ink particles to rise to the surface as a black foam which can be continuously removed.

9 Claims, 2 Drawing Sheets

METHOD OF BLEACHING DE-INKED PULP AND REMOVING THE INK PARTICLES WITH STEAM

BACKGROUND OF THE INVENTION

1. Field of the invention

This invention relates to a reductive method of bleaching de-inked paper pulp, and removing ink particles therefrom.

In recent years there has been a substantial increase in the recycling of newsprint, magazines and other paper which has a significant content of printing ink.

2. Description of the Prior Art

In conventional processes, pulp containing recycled paper is subjected to an oxidative de-inking process to release ink particles from the fibres. The resulting pulp is however likely to have a grey or yellowish color and must be subjected to a further bleaching step, for example using sodium hydrosulfite, and possibly also the addition of kaolin.

Kaolin and the chemicals used in bleaching such as sodium hydrosulfite and sodium borohydride are expensive, and bleaching may still not be entirely satisfactory if ink particles remain in the pulp.

SUMMARY OF THE INVENTION

It is accordingly an object of the present invention to provide a process for bleaching and ink removal which gives an increased brightness gain while reducing the quantity of chemicals required and thus reducing the cost.

In accordance with the present invention, de-inked paper pulp is bleached by adding sulfite or bisulfite ions and a reducing agent and bubbling steam through the pulp. This has been found to have an unexpected synergistic effect in that the steam not only raises the temperature of the pulp and thus enhances the bleaching but also causes released ink particles to rise to the surface of the pulp as a black foam which can then be skimmed off. Both these effects contribute to an overall brightness gain.

The preferred bleaching agents are sodium bisulfite and sodium borohydride, both added in aqueous solution. The sodium borohydride may suitably be in the form of an aqueous mixture sodium hydroxide and 10–85 weight % of sodium borohydride. One particularly suitable agent is a borohydride/hydroxide mixture sold by Morton International Inc. under the trade mark Borol, comprising 12% sodium borohydride, 40% sodium hydroxide and 48% water, all by weight. This mixture is preferably diluted before being used for bleaching.

As an alternative to sodium borohydride, sodium hydrosulfite ($Na_2S_2O_4$) can be used.

The process can be started at or around room temperature, the steam bubbling taking the temperature up to a temperature in the range from 60–90° C. The steam bubbling step may suitably be carried out for a period from 5–30 minutes, typically 10–15 minutes.

The overall bleaching process generally raises the pH of the pulp slightly, typically taking it from a slightly acidic pH to a neutral or slightly alkaline one. The preferred starting pH is from 6 to 6.8 and the finishing pH will typically be in the range from 7 to 9.

The removal of ink particles may be assisted by adding a soap or other surfactant such as lecithin.

The consistency of the pulp is preferably in the region of 2–5%.

Sodium bisulfite is preferably added to the pulp in an amount of 1–5 weight percent based on oven dried pulp (ODP). Sodium borohydride is preferably added in an amount from 0.012 to 0.12 weight percent, which can be achieved by adding Borol solution, described above, in an amount of 0.1 to 1 weight percent. It has been found that the best brightness gain is obtained in the region from 0.5 to 1 weight percent of Borol, based on ODP.

Further objects and advantages of the invention will become apparent from the following detailed reference to the accompanying which illustrate preferred embodiments thereof.

DETAILED DESCRIPTION OF THE INVENTION

Figure 1:
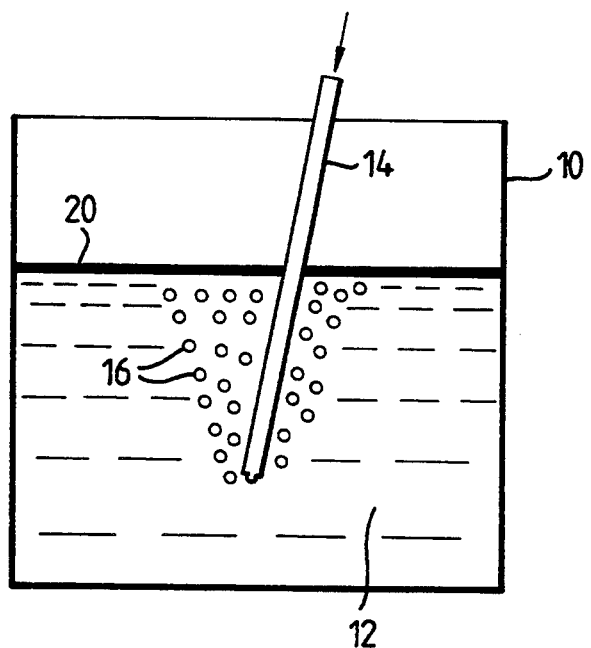
FIG. 1 illustrates schematically the process of the invention.

Referring first to FIG. 1, a pulp mixture 12 in a flotation tank 10 is bleached with sulfite or bisulfite ions and a reducing agent such as sodium borohydride. Steam is continually passed through the mixture by means of a pipe 14, raising the bleaching temperature to enhance the brightness gain. The steam injection also agitates the mixture, and as steam bubbles 16 rise to the surface they carry with them ink particles released from the pulp fibres by the de-inking process. The ink particles collect on the pulp surface in a black foam, which can be continuously removed.

The following example illustrates a preferred embodiment of the invention.

In each of eight trials, a metal drum used as a flotation cell was filled with 4 litres of cold de-inked pulp at a consistency of 4%. The pulp had an initial pH in the region of 6.9 and an initial ISO brightness BR of 57.33. In each trial, diluted sodium bisulfite and varying amounts of diluted Borol solution were added to and mixed with the pulp in the amounts shown in the table below.

For a period of 10 minutes, steam was bubbled through the mixture, raising the pulp temperature as shown in the table. A black foam of released ink particles appeared on the surface of the pulp and, except in the case of trials E and G, was continuously removed, manually, with the aid of a beaker. Initial and final pH and temperature were measured, as was the final brightness of the resulting pulp in each case. The results are shown in the following table.

| Trial | Added Water (l) | Bisulphite Vol. (ml) | Bisulphite % on ODP | Borol Vol. (ml) | Borol % on ODP | Temperature °C. Initial | Temperature °C. Final | PH Initial | PH Final | Brightness Y | Brightness BR (ISO) |
|---|---|---|---|---|---|---|---|---|---|---|---|
| A | 0 | 32 | 2 | 16 | 1 | 26.1 | 67 | 6.4 | 8.9 | 68.33 −68.19 | 62.29 −63.11 |

-continued

| Trial | Added Water (l) | Bisulphite Vol. (ml) | Bisulphite % on ODP | Borol Vol. (ml) | Borol % on ODP | Temperature °C. Initial | Temperature °C. Final | PH Initial | PH Final | Brightness Y | Brightness BR (ISO) |
|---|---|---|---|---|---|---|---|---|---|---|---|
| B | 4 | 64 | 4 | 16 | 1 | 18 | 75 | 6.6 | 6.9 | 68.32 –68.27 | 62.39 –62.34 |
| C | 0 | 32 | 2 | 8 | 0.5 | 18 | 82 | 6.5 | 8.6 | 67.48 –67.79 | 61.73 –62.03 |
| D | 0 | 32 | 2 | 12 | 0.75 | 18 | 73 | 6.5 | 8.5 | 69.05 –68.96 | 64.07 –63.96 |
| E* | 0 | 32 | 2 | 8 | 0.5 | 18 | 68 | 6.35 | 7.2 | 67.74 –67.75 | 61.82 –61.72 |
| F | 0 | 32 | 2 | 4 | 0.25 | 24 | 85 | 6.6 | 6.5 | 66.93 –67.03 | 59.96 –60.17 |
| G* | 0 | 32 | 2 | 12 | 0.75 | 21 | 70 | 6.3 | 7.09 | 66.90 –66.54 | 61.08 –60.71 |
| H | 0 | 32 | 2 | 8 | 0.5 | 22 | 64 | 6.6 | 7.2 | 66.85 –66.43 | 59.85 –59.71 |

*Foam not removed

The standards used to determine the brightness factors Y and BR are:
Y : TAPPI T 527 SV-72
BR (ISO) : TAPPI T 452 OM-87

It can be seen from the table that the maximum brightness gain was 6.74 points, obtained in trial D, which used 2 weight percent on ODP of sodium bisulfite and 0.75 weight percent on ODP of Borol. This corresponds to a sodium borohydride content in the pulp of 0.09 weight percent on ODP.

Figure 2:
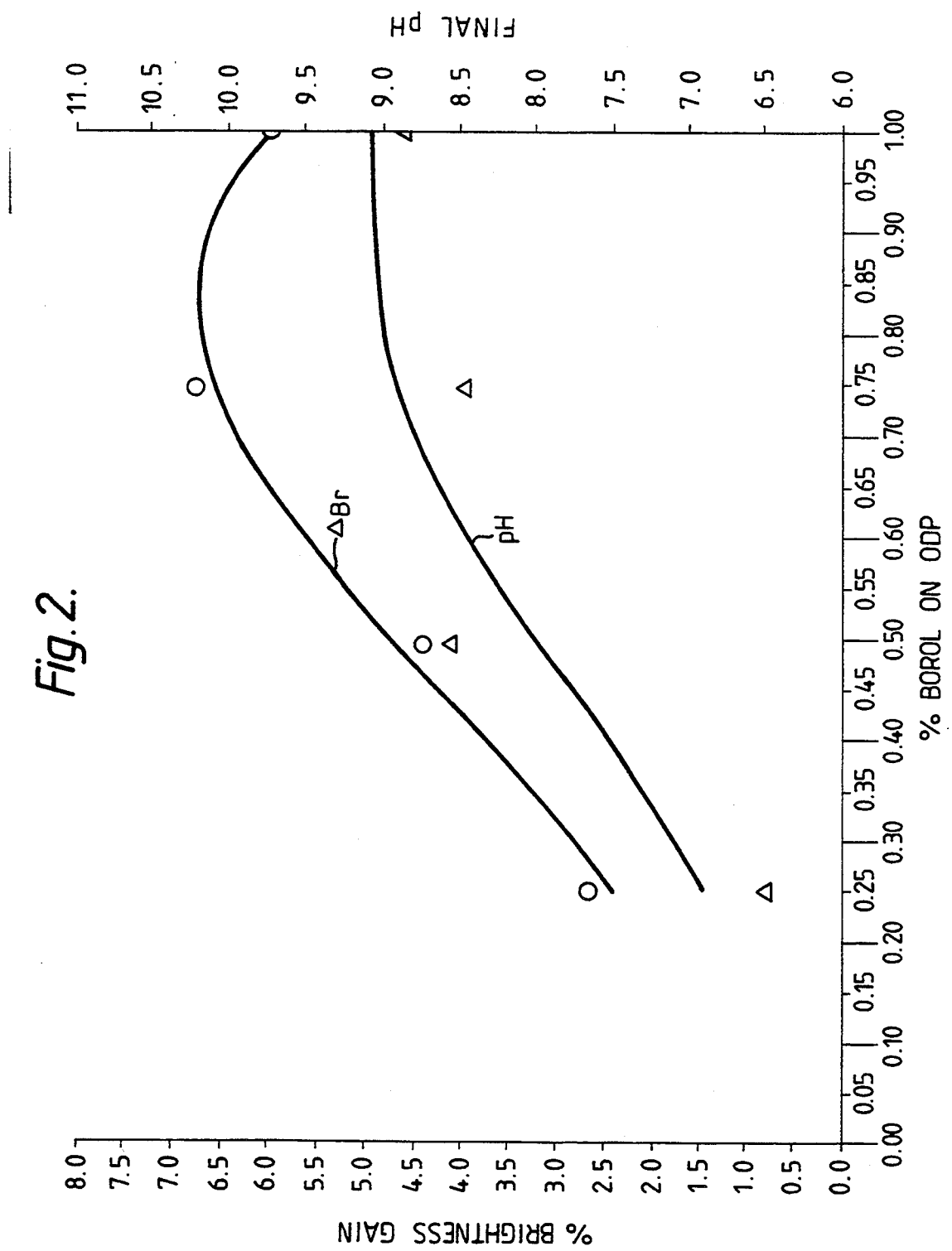
FIG. 2 is a graph showing how final pH and brightness gain vary with the concentration of Borol added to the pulp.

The graph of FIG. 2 shows how final pH and brightness gain vary with the percentage of Borol used. It can be seen from this that there is an optimum level for the addition of Borol of from about 0.7 to 1 weight percent, corresponding to 0.084 to 0.12 weight percent of sodium borohydride on ODP. Above this optimum range there is no further brightness gain and indeed, the brightness falls away somewhat. There is thus nothing to be gained by further increasing the use of expensive sodium borohydride.

What is claimed is:

1. A process for bleaching de-inked pulp and removing ink particles therefrom, which comprises in combination the steps of adding sulfite or bisulfite ions and a reducing agent to the pulp, bubbling steam therethrough to cause ink particles to rise to the surface of the pulp, and removing the ink particles from the surface wherein steam is bubbled through cold pulp having a consistency of 2-5% for a period of 5-30 minutes to raise the temperature of the pulp to 60-90° C., said combination of steps resulting in pulp having an increased brightness gain while reducing the quantity of chemicals required.

2. A process as claimed in claim 1 wherein the bisulfite ions are added in an aqueous solution of sodium bisulfite.

3. A process as claimed in claim 2 wherein the sodium bisulfite is added in an amount of about 1-5 weight % based on oven-dried pulp (ODP).

4. A process as claimed in claim 1 wherein the reducing agent is sodium borohydride.

5. A process as claimed in claim 4 wherein the sodium borohydride is added in an amount of about 0.012 to 0.12 weight % based on over-dried pulp.

6. A process as claimed in claim 4 wherein the sodium borohydride is added by introducing about 0.5 to 1 weight % based on over-dried pulp of an aqueous solution containing sodium hydroxide and about 10-15 weight % of sodium borohydride.

7. A process as claimed in claim 1 wherein the reducing agent is sodium hydrosulfite.

8. A process as claimed in claim 1 wherein the initial pulp is slightly acidic and the overall bleaching process gives a final pH value of about 7 to 9.

9. A process as claimed in claim 1 wherein a surfactant is added to the pulp to assist the removal of ink particles.

* * * * *